US008650564B2

(12) United States Patent
Huang et al.

(10) Patent No.: US 8,650,564 B2
(45) Date of Patent: Feb. 11, 2014

(54) METHOD AND SYSTEM FOR SYNCHRONIZING FAULT-TOLERANT VIRTUAL MACHINES AND ADJUSTING CPU RESOURCE LIMIT BASED ON EXECUTION LATENCY

(75) Inventors: Lan Huang, Sunnyvale, CA (US); Daniel J. Scales, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 223 days.

(21) Appl. No.: 12/907,687

(22) Filed: Oct. 19, 2010

(65) Prior Publication Data

US 2012/0096458 A1 Apr. 19, 2012

(51) Int. Cl.
G06F 9/455 (2006.01)
G06F 11/00 (2006.01)

(52) U.S. Cl.
USPC ..................................... 718/1; 714/2; 714/12

(58) Field of Classification Search
None
See application file for complete search history.

(56) References Cited

U.S. PATENT DOCUMENTS

| 5,875,320 | A * | 2/1999 | Gu | 713/375 |
|---|---|---|---|---|
| 6,625,751 | B1 * | 9/2003 | Starovic et al. | 714/11 |
| 6,832,367 | B1 * | 12/2004 | Choi et al. | 717/130 |
| 7,779,424 | B2 * | 8/2010 | Cherkasova et al. | 719/321 |
| 7,797,682 | B2 * | 9/2010 | Stocker | 717/126 |
| 8,020,041 | B2 * | 9/2011 | Huang et al. | 714/11 |
| 8,060,875 | B1 * | 11/2011 | Lambeth | 718/1 |
| 8,146,078 | B2 * | 3/2012 | Bennett et al. | 718/1 |
| 8,209,681 | B1 * | 6/2012 | Turner et al. | 718/1 |
| 2002/0095610 | A1 * | 7/2002 | Nunomura | 713/322 |
| 2006/0085785 | A1 * | 4/2006 | Garrett | 718/1 |
| 2008/0028145 | A1 * | 1/2008 | Lecomte et al. | 711/114 |
| 2008/0189468 | A1 * | 8/2008 | Schmidt et al. | 711/6 |
| 2008/0189700 | A1 * | 8/2008 | Schmidt et al. | 718/1 |
| 2008/0201602 | A1 * | 8/2008 | Agarwal et al. | 714/4 |
| 2008/0244535 | A1 * | 10/2008 | Nelson et al. | 717/129 |
| 2009/0070761 | A1 * | 3/2009 | Zhao | 718/1 |
| 2009/0089879 | A1 * | 4/2009 | Wang et al. | 726/24 |
| 2009/0113109 | A1 * | 4/2009 | Nelson et al. | 711/6 |
| 2009/0119538 | A1 * | 5/2009 | Scales et al. | 714/6 |
| 2009/0119665 | A1 * | 5/2009 | Venkitachalam et al. | 718/1 |
| 2009/0138752 | A1 * | 5/2009 | Graham et al. | 714/4 |
| 2010/0037089 | A1 * | 2/2010 | Krishnan et al. | 714/5 |
| 2010/0107158 | A1 * | 4/2010 | Chen et al. | 718/1 |
| 2010/0153945 | A1 * | 6/2010 | Bansal et al. | 718/1 |
| 2010/0257524 | A1 * | 10/2010 | Weissman et al. | 718/1 |
| 2010/0287421 | A1 * | 11/2010 | Golowner et al. | 714/55 |
| 2011/0022812 | A1 * | 1/2011 | Van Der Linden et al. | 711/163 |
| 2011/0142053 | A1 * | 6/2011 | Van Der Merwe et al. | 370/395.1 |
| 2012/0096205 | A1 * | 4/2012 | Velayudhan et al. | 710/260 |

* cited by examiner

*Primary Examiner* — Meng An
*Assistant Examiner* — Bradley Teets (57) ABSTRACT

Primary and secondary virtual machines each executing on a separate physical host and forming a fault-tolerant pair synchronize their execution with each other as closely as possible such that the secondary can take over execution of the primary with little or no disruption of service and no loss of data. To provide fast takeover, the execution latency between the two virtual machines is kept to a minimum by incrementally adjusting the CPU allocation to the primary virtual machine. The CPU allocation to the primary virtual machine decreases when the execution latency is large and increases when the execution latency is small. In order to maximize the performance of the primary virtual machine, the system seeks to maximize the CPU resource limit for the primary virtual machine for as long as possible while minimizing the execution latency.

20 Claims, 10 Drawing Sheets

METHOD AND SYSTEM FOR SYNCHRONIZING FAULT-TOLERANT VIRTUAL MACHINES AND ADJUSTING CPU RESOURCE LIMIT BASED ON EXECUTION LATENCY

BACKGROUND

As the advantages of virtual machine (VM) technology have become widely recognized, more and more companies are running multiple virtual machines on a single host platform as a way of consolidating multiple workloads on the same server; such consolidation improves the utilization of their computing resources and reduces costs. In addition, just as virtual machine technologies create abstracted versions of the underlying hardware to achieve server consolidation, so too can virtual machine technology be used to achieve software fault tolerance of two or more virtual machines running on separate physical host platforms.

Two virtual machines running on two separate physical hosts are a "fault-tolerant" virtual machine pair that behaves, as far as the outside world is concerned, as a single "logical" virtual machine. Such an organization of two virtual machines protects against a single failure; that is, if one virtual machine fails or its physical host crashes, the other virtual machine takes over and continues executing operations as if nothing untoward had occurred. In such an approach, one virtual machine in the pair is designated the primary virtual machine and the other virtual machine is designated the secondary virtual machine. Users interact with the logical virtual machine only via the primary virtual machine; the secondary virtual machine is invisible.

In order for the primary virtual machine to fail over to the secondary virtual machine without loss of availability or data, the secondary virtual machine needs to have the same state information that the primary virtual machine had at the time of the primary virtual machine's failure. To ensure this, the primary virtual machine during normal operation sends enough data to the secondary virtual machine such that the state of the secondary virtual machine tracks the state of the primary as closely as possible. If the secondary virtual machine tracks the state of the primary virtual machine exactly at every instruction boundary, then the secondary virtual machine is said to be in "lockstep" with the primary virtual machine. Unfortunately, lockstep virtual machines severely affect performance during normal operation because the primary virtual machine must wait—synchronously—for the secondary virtual machine to update its state before returning successfully.

To achieve better performance during normal operation than a lockstep approach—at the cost of potential disruption of service because of longer takeover times—the secondary virtual machine's state is allowed to lag behind the primary virtual machine state. This approach is sometimes called "virtual lockstep." A drawback of this approach is that upon failure the secondary virtual machine is not available immediately. Before it becomes available, it must catch up to the primary virtual machine's state at the time the primary virtual machine failed.

SUMMARY

One or more embodiments of the invention provide a method for reducing the execution latency between a primary virtual machine and a secondary virtual machine, which are organized as a fault-tolerant pair of virtual machines, by adjusting the amount of CPU resources allocated to the primary virtual machine. This adjustment occurs incrementally over time as the execution latency is constantly monitored. The primary virtual machine may operate at a reduced CPU limit for a time interval until the execution latency is reduced to an acceptable level. The CPU limit may then be stabilized at the highest CPU limit possible in order to maximize performance of the primary virtual machine while at the same time keeping the execution latency to a low value.

Additional embodiments of the present invention provide a non-transitory computer readable storage medium and a computer system each containing instructions which, when executed by a processing unit, cause the processing unit to carry out one or more of the methods set forth herein.

DETAILED DESCRIPTION

Figure 1A:
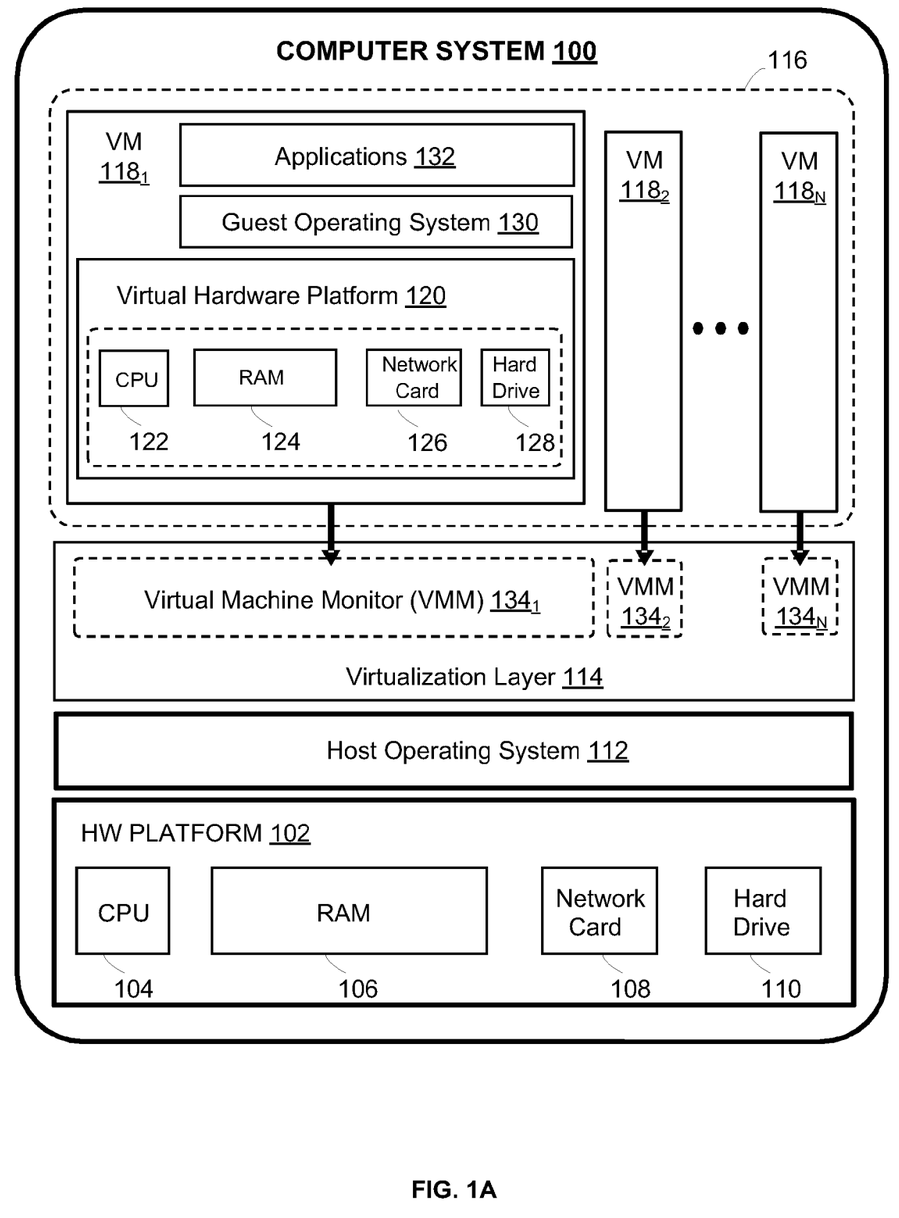
FIG. 1A depicts a block diagram of an SMP-based virtualized computer system that may be used with one or more embodiments of the present invention.

FIG. 1A depicts a functional block diagram of a virtualized computer system that may be used with one or more embodiments of the present invention. A computer system 100 may be constructed on a typical desktop or laptop hardware platform 102 such as an x86 architecture platform. Such a hardware plaform may include a CPU 104, RAM 106, network card 108, hard drive 110 and other I/O devices such as mouse and keyboard (not shown in FIG. 1A). A host operating system 112 such as MICROSOFT WINDOWS, LINUX OR NETWARE (which are trademarks of Microsoft Corporation, Linus Torvalds, and Novell, Inc., respectively) runs on top of hardware platform 102. A virtualization software layer 114 is installed on top of hardware platform 102 and provides a virtual machine execution space 116 within which multiple virtual machines (VMs) $118_1$-$118_N$ may be concurrently instantiated and executed. In particular, virtualization layer 114 maps the physical resources of hardware platform 102 (e.g., CPU 104, RAM 106, network card 108, hard drive 110, mouse, keyboard, etc.) to "virtual" resources of each virtual machine $118_1$-$118_N$ such that each virtual machine $118_1$-$118_N$ has its own virtual hardware platform 120 with its own emulated CPU 122, RAM 124, network card 126, hard drive 128 and other emulated I/O devices. For example, virtual hardware platform 120 may function as an equivalent of a standard x86 hardware architecture such that any x86 supported operating systems such as MICROSOFT WINDOWS, LINUX, SOLARIS x86 (a trademark of Oracle America, Inc.), NETWARE, FREEBSD (a trademark of The FreeBSD), etc. may be installed as the guest operating system 130 in order to execute applications 132 for an instantiated virtual machine such as $118_1$. As part of the virtualization layer 114, virtual machine monitors (VMM) $134_1$-$134_N$ implement the virtual system support needed to coordinate operation between the host operating system 112 and their corresponding virtual machines $118_1$-$118_N$. An example of software implementing a virtualization layer 114 for a desktop or laptop hardware platform 102 is VMware WORKSTATION™, which is available from VMware, Inc. of Palo Alto, Calif.

Figure 1B:
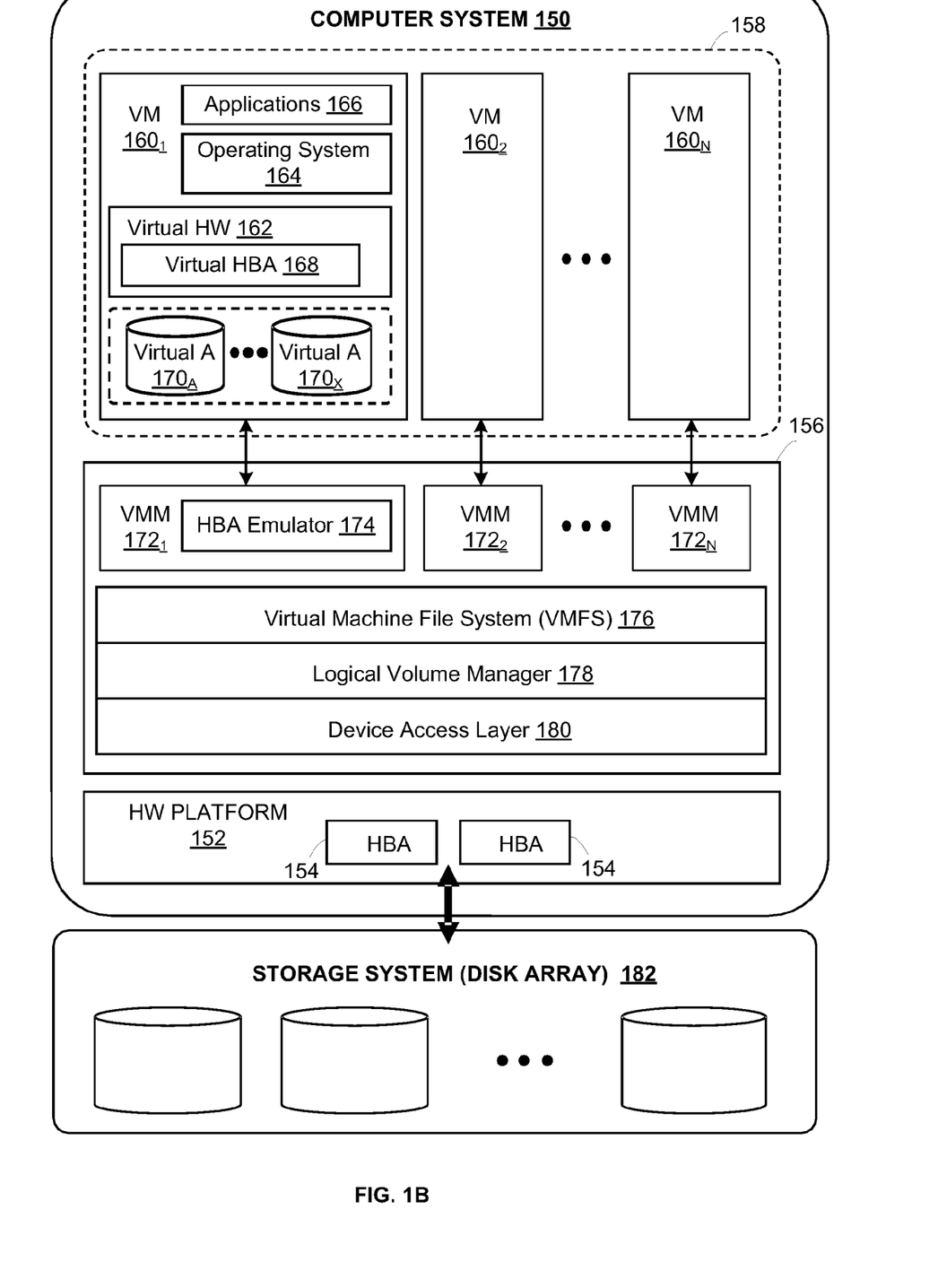
FIG. 1B depicts a functional block diagram of a second computer system implementing a virtualized computer platform that may be used with one or more embodiments of the present invention.

FIG. 1B depicts a computer system 150 as an alternative system that may be used with one or more embodiments of the present invention. Computer system 150 may be constructed on a conventional server-class, hardware platform 152 including host bus adapters (HBA) 154 in addition to conventional platform processor, memory, and other standard peripheral components (not shown). Hardware platform 152 may be coupled to an enterprise-class storage system 182. Examples of storage system 182 may be a network attached storage (NAS) device and storage area network (SAN) arrays. Enterprise-level implementations of the foregoing may have multiple computer systems similar to computer system 150 that may be connected through various different topologies and technologies (e.g., switches, etc.) to multiple storage systems 182. VMkernel 156 is installed on hardware platform 152 and supports virtual machine execution space 158 within which multiple VMs $160_1$-$160_N$ may be concurrently instantiated and executed. Each such virtual machine $160_1$-$160_N$ implements a virtual hardware (HW) platform 162 that supports the installation of a guest operating system 164 which is capable of executing applications 166. Similar to guest operating system 130, examples of guest operating system 164 may be MICROSOFT WINDOWS, LINUX, SOLARIS x86, NETWARE, FREEBSD or any other operating system supported by the virtualized software. In each instance, guest operating system 164 includes a native file system layer (not shown), for example, either an NTFS or an ext3 type file system layer. The native file system layer interfaces with virtual hardware platform 162 to access, from the perspective of guest operating system 164, a data storage HBA, which in reality, is virtual HBA 168 implemented by VMM 172 that emulates virtual disks $170_A$-$170_X$. The virtualization of disk storage is therefore transparent to guest operating system 164, which accesses virtual disk $170_X$ as it would any physical storage device. It should be recognized that FIG. 1B, as distinguished from FIG. 1A, depicts a bare-metal or native implementation where there is no host operating system, but instead a small kernel (VMkernel) that is optimized for running virtual machines.

Figure 2:
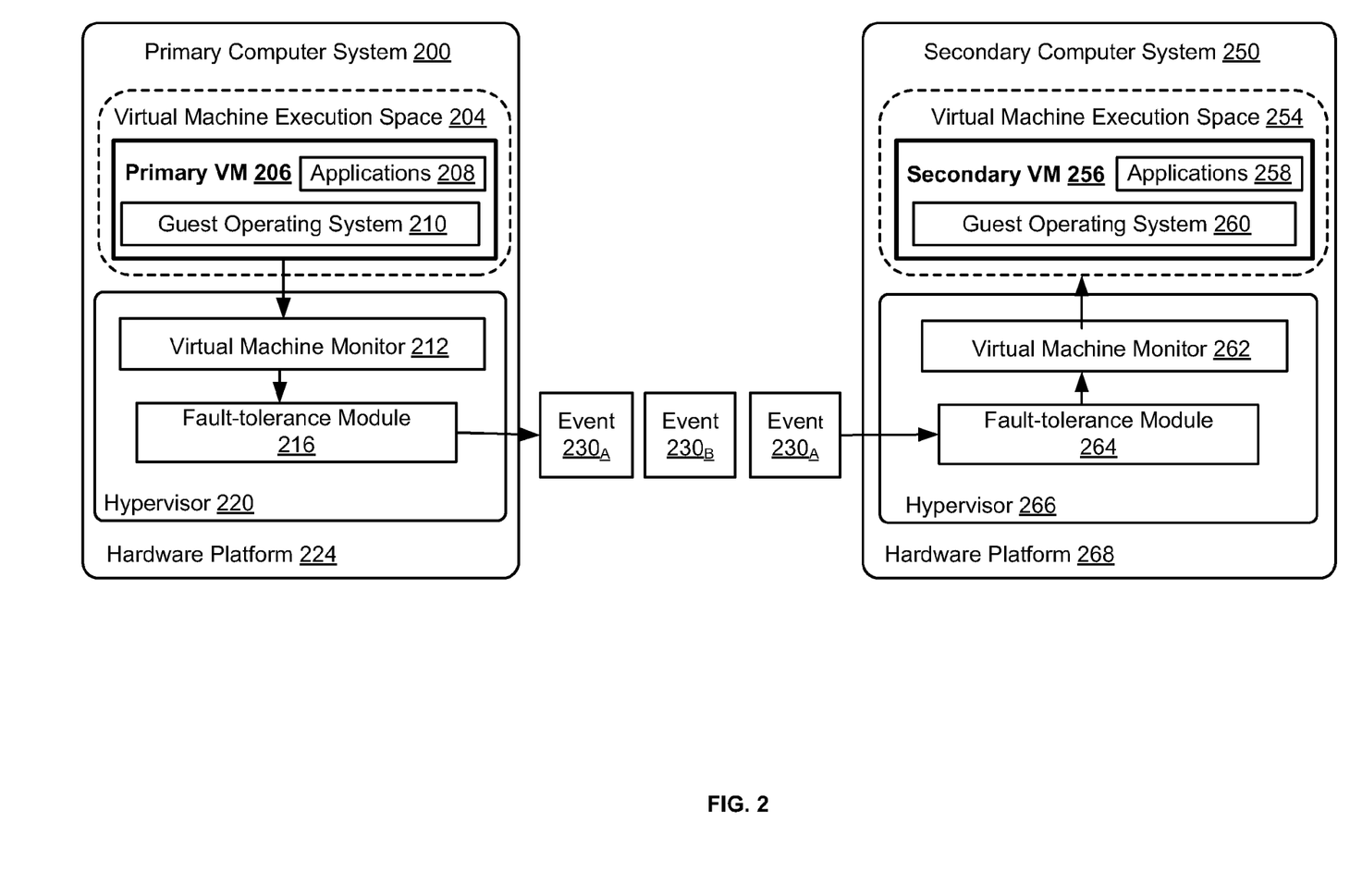
FIG. 2 depicts a fault-tolerant pair of VMs executing on two separate physical hosts that may implement one or more embodiments of the present invention.

FIG. 2 illustrates a fault-tolerant (FT) pair of VMs executing on two separate physical hosts that may implement one or more embodiments of the present invention. For clarity, this figure shows only some of the components of such an FT pair and is a simplification of FIG. 1B. In the embodiment of FIG. 2, a primary VM 206 running on a primary computer system 200 is supported by a secondary VM 256 running on a secondary computer system 250. When primary VM 206 fails, secondary VM 256 may take over the functions of the primary VM 206. In the embodiment shown in FIG. 2, a primary VM and a secondary VM run on its own hardware computer system (200 and 250) in order to improve the availability of the services provided by the FT pair of VMs in the face of failures. It should be recognized that other variations of fault-tolerant virtual machine architectures may be used without affecting the spirit of the present invention. For example, in one embodiment, both primary VM 206 and secondary VM 256 may share a common storage system rather than individual hard drives. Similarly, the primary VM and secondary VM may be run on the same hardware computer system in an alternative embodiment, although this embodiment may not provide the same strong guarantees in the face of hardware failures.

To improve availability of the services provided by the applications in the presence of failures, an FT pair as embodied in FIG. 2 provides at least two guarantees: (1) no information maintained by the pair of VMs is lost during a single failure, thus providing data availability; and (2) fail over from the primary VM 206 to the secondary VM 256 is sufficiently fast resulting in little or no disruption in service availability. Thus, the client of applications 258 provided by the secondary VM 256 perceives very little disruption in service and no loss of data when primary VM 206 fails. In one embodiment, such clients reconnect to the secondary VM 256 (and thus to applications 258) when their connections were broken by the failure of the primary VM 206. This reconnection usually occurs automatically and transparently to the clients, thus masking the primary VM 206's failure.

To achieve the first guarantee, namely that no information is lost, an FT pair ensures that the state information maintained by the secondary VM 256 is identical to the state information maintained by the primary VM 206. The state information may include applications executing in memory and the data they are manipulating, as well as the state of the guest operating system 210 itself. While the primary VM 206 is executing in virtual machine execution space 204, the virtual machine monitor (VMM) 212 in the hypervisor 220 virtualizes the underlying hardware platform 224 architecture for the executing virtual machine. Furthermore, the VMM 212 can capture the instructions in the instruction stream of primary VM 206 and expresses them as 'events.' These events could capture all instructions or more typically capture only the non-deterministic instructions. These non-deterministic instructions include reads from external devices (such as network, keyboard or timer) and virtual machine interrupts (such as indication after a data reconstruction that Direct Memory Access transfer from disk has been completed and is ready to be read). At the secondary VM 256, the initial state of the primary VM 206 would be instantiated and the instruction stream would be 'rolled forward' against the initial state by executing the instructions in the stream resulting in a final state that corresponds to the state of the primary VM 206 at a specific point in time.

Rather than a wholesale transfer of initial state and instruction stream to the secondary VM, in another embodiment, both the primary VM 206 and the secondary VM 256 start in the same state. As the primary VM 206 executes, events are generated by the VMM 212 and passed to the fault-tolerance module 216. Fault-tolerance module 216 ensures that each event is sent in the execution order of the primary VM 206. Thus, event $230_A$, event $230_B$, and event $230_C$, which are executed by the primary VM 206 in that order, are sent to the secondary computer system 250 in that order. The fault-tolerance module 264 on the secondary computer system 250 receives each event from the corresponding fault-tolerance module 216 at the primary computer system 200 and sends back an acknowledgment 'ack' to the fault-tolerance module 216 on the primary computer system 200 for each event. For each event sent from the primary VM 206 to the secondary VM 256, the primary VM 206 should receive an ack for that event. Because it would be slow for the primary VM 206 to wait for each ack synchronously, the primary VM 206 continues executing, and asynchronously takes note of each ack as it arrives. This ack indicates receipt of the event, not that the secondary VM executed the event and updated its state. The fault-tolerance module 264 on the secondary computer system 250 eventually processes each received event in the same execution order as at the primary and causes the state of the secondary VM 256 to reflect that processing via the VMM 262 and thence to the secondary VM 256 for execution. If the primary computer system 200 failed after Event $230_C$ was received, acknowledged, and processed at the secondary computer system 250, then it is assured that the state of the primary VM 206 and the state of the secondary VM 256 is identical and so the first guarantee is achieved. In an alternative embodiment, the secondary VM 256 does not send an ack for each event, but instead sends acks for bunches of events received at around the same time, so as to reduce the ack traffic.

To achieve the second guarantee, namely, to provide very little disruption in service availability, a FT VM pair ensures that the state of the secondary VM tracks the state of the primary VM as closely as possible. Sending and receiving events are necessary but not sufficient; events represent updates that will eventually be applied to the state, but are not the state itself. The secondary VM may execute in the background and use vital CPU resources to execute each event, which may be held in an in-memory event buffer until the events are actually applied to the state.

Figure 3:
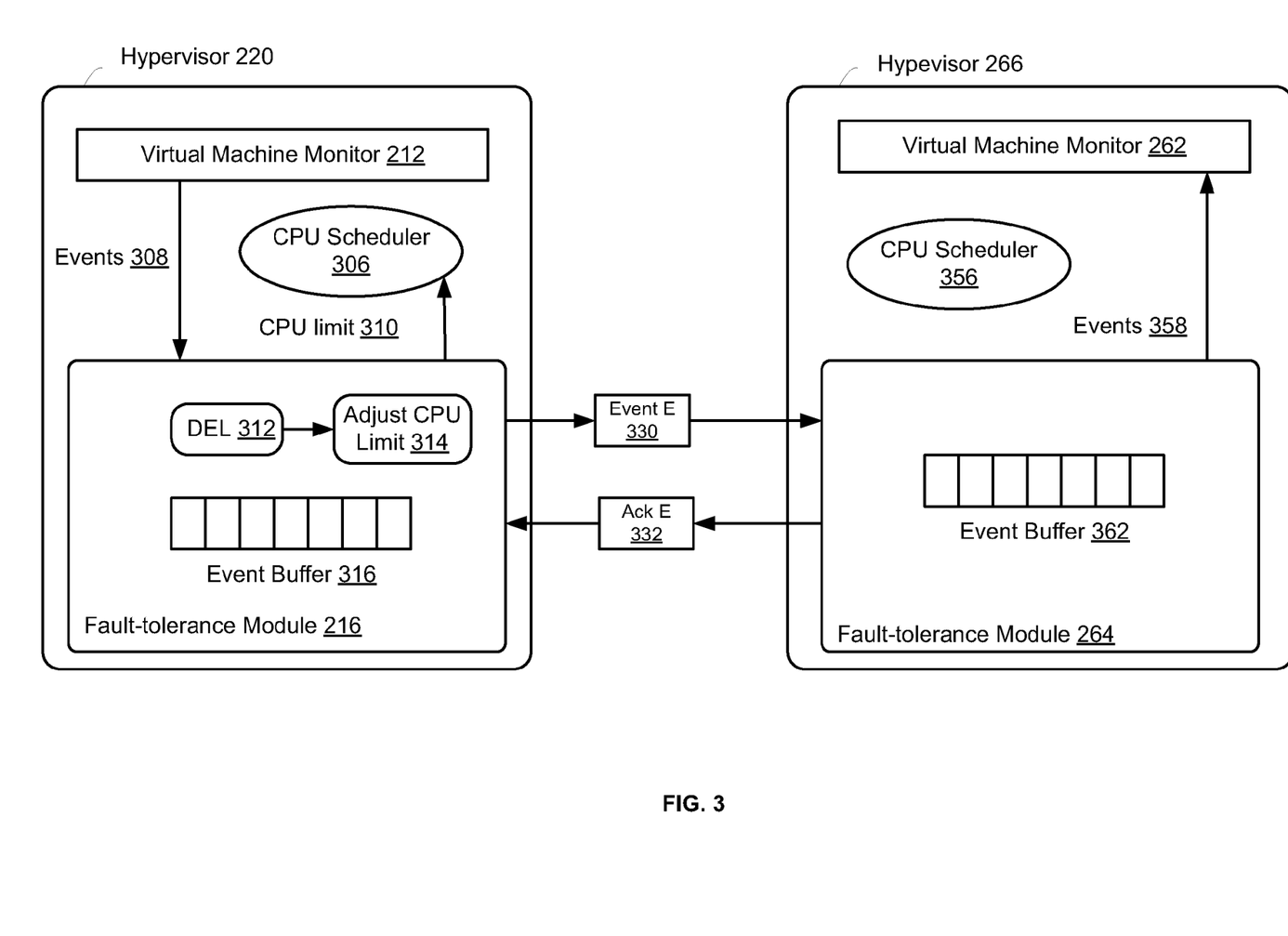
FIG. 3 depicts a block diagram of a primary VM and a secondary VM engaging in sending and acknowledging events in accordance with one or more embodiments of the present invention.

FIG. 3 illustrates more specifically how an event is sent from the fault-tolerance module of the primary computer system and how that same event is acknowledged in accordance with one or more embodiments of the present invention. In particular, this figure is a simplification of FIG. 2 and depicts only the hypervisor 220 on the primary computer system 200 and hypervisor 266 on the secondary computer system 250. Included in hypervisor 220 is a Virtual Machine Monitor (VMM) 212 and a fault-tolerance module 216. Similarly, hypervisor 266 in the secondary computer system 250 includes a VMM 262 and a corresponding fault-tolerance module 264.

While the primary VM (not shown) executes on the primary computer system 200, the VMM 212 converts the execution instructions to events 308, which are delivered to fault-tolerance module 216 for further processing. The fault-tolerance module 216 maintains an event buffer 316 into which it inserts these generated events. The events are inserted into event buffer 316 in execution order because after transmission to the secondary VM, they are to be executed at the secondary VM in precisely the same order they were executed at the primary VM.

In FIG. 3, the fault-tolerance module 216 at the primary computer system 200 has sent event E 330 at time $T_1$ to the fault-tolerance module 264 at the secondary computer system 250. Upon receipt of event E 330 by the secondary computer system 250, the fault-tolerance module 264 processes the event. Processing the event involves inserting the event E 330 into event buffer 362 at the same offset of the event in the event buffer 316 of the primary VM and ensuring that these events in event buffer 362 are executed by passing the events 358 in order up to the VMM 262 for eventual execution. Processing the event further involves sending back a reply, an ack E 332, to the sender (fault-tolerance module 216) to acknowledge receipt of event E 330. This ack E 332 includes additional information piggybacked on it, including the time at which the most recent event was executed at the secondary VM. This fault-tolerance module 264 can inform the sender which event was executed at what time.

FIG. 3 shows ack E 332 flowing back to the fault-tolerance module 216 at the primary computer system 200. Fault-tolerance module 216 processes this ack E 332 from the receiver, extracting the piggybacked information 'data.' At this point, the primary VM knows that an event has executed at an earlier time at the secondary VM, which has updated its state accordingly. But this is neither the ack nor the event of interest. In one embodiment, which shall be described at length later, the fault-tolerance module 216 monitors subsequent acks, looking for the piggybacked data corresponding to event E 330 and its execution time $T_J$ at the secondary VM. The difference $T_J-T_I$ is determined to be the execution latency for this event. In an alternative embodiment, which may be used when the times between the two computer systems are not synchronized, the time $T_J$ could just be the time when the ack for event E 332 arrived at hypervisor 220. This would overestimate the execution latency, but only by the transmission time from hypervisor 266 to hypervisor 220.

FIG. 3 also shows a DEL (Determine Execution Latency) module 312 that computes the execution latency given both time inputs $T_J$ and $T_I$. Given this determination of the execution latency, the system invokes the Adjust CPU Limit module 314 that attempts to throttle the CPU resource limit to improve the execution latency and simultaneously to stabilize the CPU limit at a maximum operating value. This newly computed CPU limit value is sent to the CPU Scheduler 306 in hypervisor 220, which performs throttling based on the new CPU limit.

Figure 4:
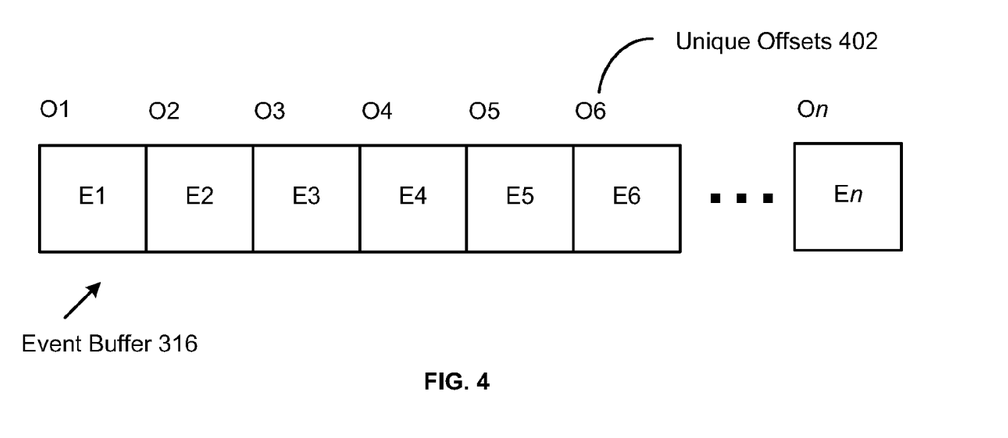
FIG. 4 depicts an event buffer in accordance with one or more embodiments of the present invention.

FIG. 4 depicts an event buffer 316 in accordance with one or more embodiments of the present invention. In one embodiment, this event buffer is fixed in size, that is, it holds a finite number of events. In another embodiment, this event buffer 316 could grow without bound provided there is enough memory to support such growth. Event buffer 316 comprises several events ranging from E0 to En. Associated with each event is a unique offset into the buffer; this offset uniquely identifies the location of the event in the buffer with respect to an initial starting point. For example, event E1 is associated with offset O1 in the event buffer; only event E1 is identified by offset O1. Similarly, event E2 is uniquely associated with offset O2 in the event buffer. In the description below, rather than referring to the event by name, the event will be referenced by its unique offset into the event buffer 316. It should be recognized that these event offsets are unique even if the buffer has a fixed size. This is ensured by having the "event offset O" grow monotonically to infinity. A modulo operation is performed on the event offset O to calculate exactly where the event is located in the circular, fixed-size event buffer.

Figure 5:
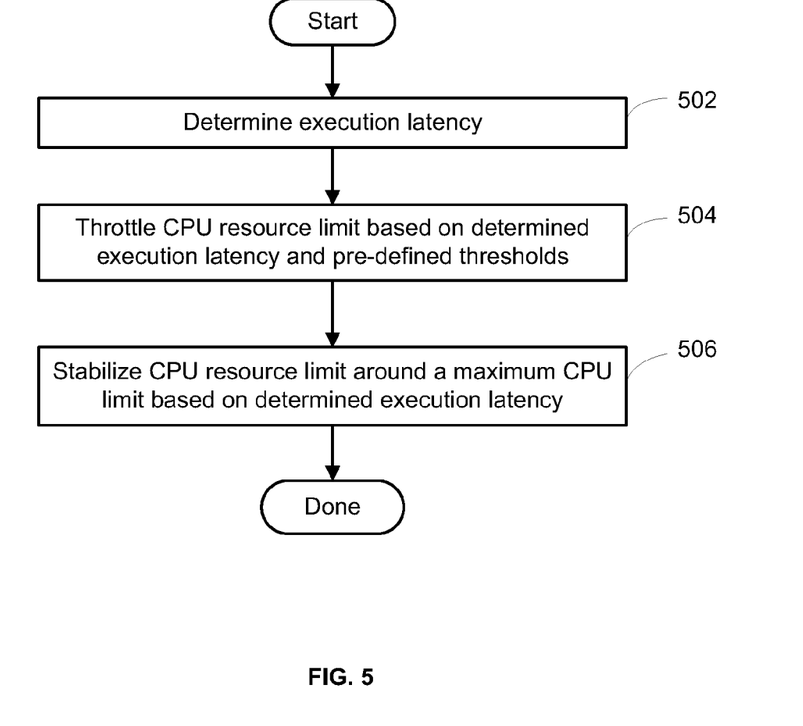
FIG. 5 presents a flowchart that illustrates the general process for synchronizing a fault-tolerant VM pair in accordance with one or more embodiments of the present invention.

FIG. 5 presents a flowchart that illustrates the general process, carried out by the system of FIG. 2, for synchronizing the fault-tolerant virtual machines in accordance with one or more embodiments of the present invention. The specific arrangement of steps shown in the figure should not be construed as limiting the scope of the embodiments.

The process begins by determining the execution latency between the primary VM and the secondary VM (step 502). Next, the system throttles the CPU resource consumption of primary VM based on the determined execution latency and several pre-defined thresholds that can be derived at runtime (step 504). The goal of throttling is to reduce the CPU limit of the primary VM incrementally downward every time the execution latency violates what is considered to be acceptable. If the execution latency after the incremental throttling is still too high, the CPU limit of the primary VM is further throttled. Next, the system stabilizes the CPU resource consumption around a maximum CPU limit (step 506). This maximum CPU limit changes dynamically as the system searches for a CPU limit that balances the cost of determining the execution latency and adjusting the CPU limit dynamically against system performance.

It is desirable to minimize execution latency for two reasons. First, minimizing the execution latency ensures a fast failover and a small window during which services provided by the FT VM pair may be visibly disrupted. When the primary host fails, causing the primary VM to die, the secondary VM needs to finish executing up to the same point that the primary VM reached before it can take over and start communicating with the external world. The larger the execution latency, the longer it takes the secondary VM to take over. Second, when execution latency is too large, the event buffer holding the events to be replayed can become full, hence delaying the primary VM's execution. While achieving a minimum execution latency between the primary and the secondary VM, it is also desirable to make sure that the primary VM achieves a performance as close to a non-fault-tolerant VM as possible. In other words, the primary VM's performance is to be reduced by a minimum amount that is needed to ensure that there is an acceptable execution latency between the primary and secondary VMs.

According to one or more embodiments of the present invention, the computed run-time execution latency between the primary VM and the secondary VM is minimized by throttling (i.e., slowing down) the CPU resource consumption of the primary VM whenever the execution latency exceeds a predefined threshold. The CPU scheduler in the hypervisor layer performs this throttling. Throttling CPU resource consumption effectively slows down the primary VM's CPU by denying the primary VM more CPU resources—and thus reducing the frequency with which events are added to the primary's event buffer—in order to allow the secondary VM to catch up with the primary VM.

Throttling the CPU resource consumption in this manner is a variation of a feedback-based control method to dynamically control the primary VM's CPU resource allocation (referred to herein as the "CPU limit" since this effectively defines a hard limit on the amount of CPU of the primary VM can use). For example, in one embodiment this CPU limit may be expressed as a percentage; the primary VM may be limited to 30% of the CPU. In another embodiment the CPU limit may be expressed in terms of CPU speed such as megahertz (MHz), which may be converted to a percentage. The feedback here is the run-time execution latency between the primary VM and the secondary VM. The CPU limit for the primary VM computed is inversely proportional to the execution latency. That is, when the execution latency is large, the primary VM receives fewer of the desired CPU resources, and when the execution latency is small, the primary VM receives more CPU resources. The adjustments are made based on the following formula, which shows that the amount of reduction of the CPU limit is proportional to the execution latency, where p is a constant parameter.

$$\text{currentCPULimit} = \text{pastCPULimit} - p \times \text{executionLatency} \quad \text{(Eq. 1)}$$

According to Eq. 1, the larger the execution latency, a greater adjustment needs to be made to the current CPU limit for the primary VM. When the execution latency is smaller, the CPU limit is kept closer to its previous value.

Besides adjusting the CPU limit to reduce execution latency, it is possible to reduce execution latency by speeding up the secondary VM. However, there may be factors that limit this approach in practice. Furthermore, it is also possible to adjust the size of the event buffer holding the events during the execution latency period; this approach can be used to indirectly throttle the delay. When the event buffer is full, the primary VM will slow down automatically since it is forced to wait to put new entries in the event buffer.

Figure 6:
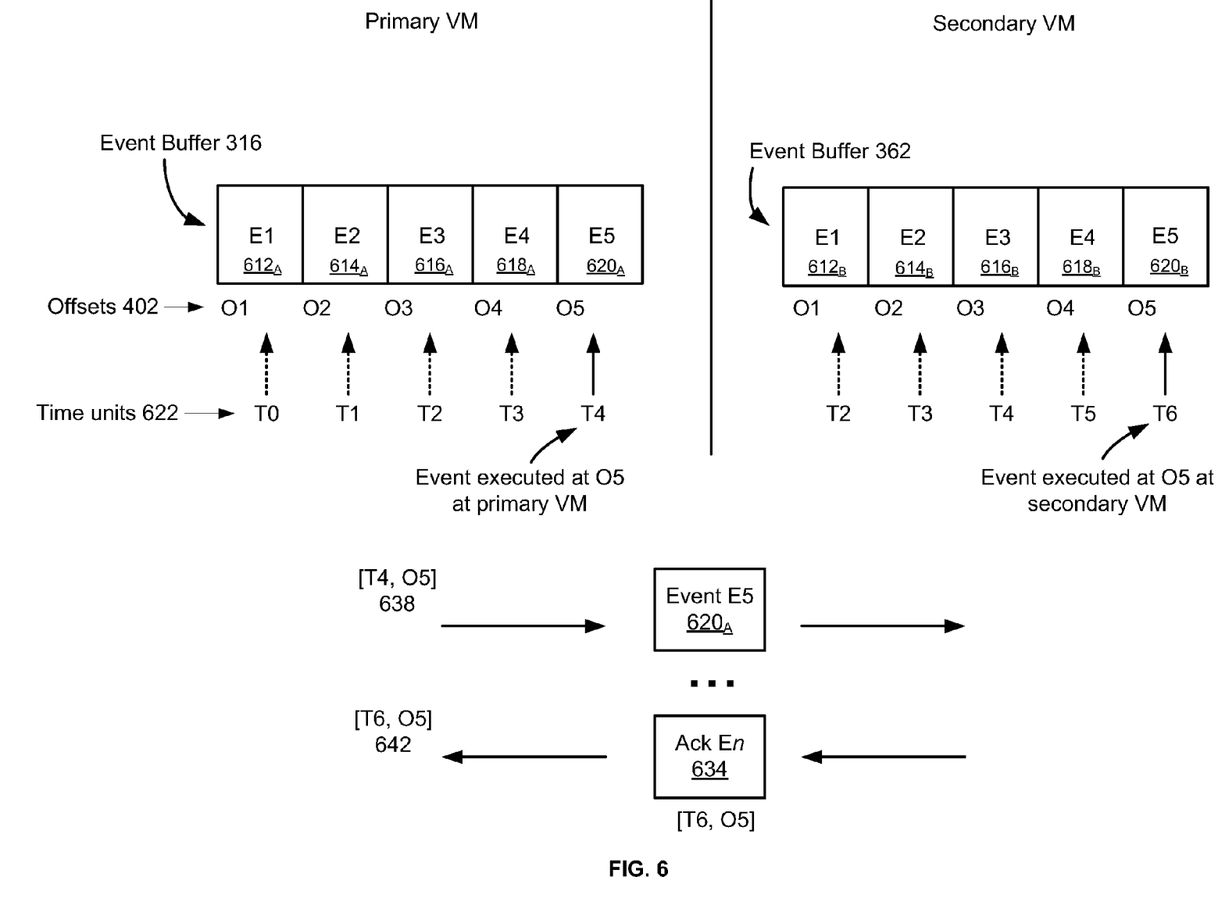
FIG. 6 presents an example of how execution latency may be calculated in a fault-tolerant VM pair in accordance of one or more embodiments of the present invention.

FIG. 6 presents an example of how execution latency may be determined in an FT VM pair in accordance with one or more embodiments of the present invention. In particular, FIG. 6 shows the primary VM 206 together with its event buffer 316, and the secondary VM 256 together with its event buffer 362. To create the current state depicted, the fault-tolerance module (not shown) at the primary VM 206 has filled event buffer 316 with five events labeled E1 $612_A$, E2 $614_A$, E3 $616_A$, E4 $618_A$, and E5 $620_A$. Similarly, the corresponding event buffer 362 at the secondary VM 256 contains the same five events arranged in the same order as at the event buffer 316 and are labeled as E1 $612_B$, E2 $614_B$, E3 $616_B$, E4 $618_B$, and E5 $620_B$. Event E 612A and E 612B are the same event in different given buffers. The offsets 402 indicate the unique positions that each event occupies in the event buffer, as explained earlier in FIG. 4. For example, event E3 $616_A$ in event buffer 316 has a unique offset O3 in the event buffer. Similarly, event E5 $620_A$ is identified by the unique offset O5 in event buffer 316. Thus, this offset will be used to identify each event in the event buffer uniquely, and it should be noted that event buffer 362 at the secondary VM 256 has the same events at the same offsets as the events in event buffer 316 at the primary VM 206.

The fault-tolerance module (not shown) at the primary VM 206 calculates the execution latency with respect to a certain offset that was already executed at the primary VM 206. For example, event E5 $620_A$ at primary VM 206 has been executed at time T4 and occupies offset O5 in the event buffer; we identify this execution by the pair [T4, O5] 638. The fault-tolerance module at primary VM 206 sends event E5 $620_A$ to the fault-tolerance module at secondary VM 256 and waits synchronously for the response. The fault-tolerance module at the secondary VM 256 receives the event E5 $620_A$ and inserts it into its event buffer 362 at offset O5 as event E5 $620_B$ and then replies with an 'ack' to the sender. It should be recognized that the sender of these events does not wait for the secondary VM 256 to execute the event; it merely waits for an acknowledgment that the secondary VM 256 received event. This asynchrony results in much better performance of the system. In one embodiment, whenever the fault-tolerance module of the secondary VM 256 needs to reply to the sender of an event, since it keeps track of which event has just been executed at which offset in the event buffer 362, it piggybacks this information on the reply to the sender, thus communicating back to the sender the offset of the event that was most recently executed at secondary VM 256. For example, in reply to event E5 $620_A$ at the primary's event buffer 316, the fault-tolerance module sends back an ack [T5,O4] if event E4 $618_B$ was just executed at secondary VM 256; [T5,O4] tells the primary VM 206 that secondary VM 256 most recently executed event E4 $618_B$ at offset O4 at time T5.

Continuing this example further, there are [T4, O5], which describes an event (E5 $620_A$) that was sent to the secondary VM 256, and an ack of that event with [T5, O4], which describes an earlier event at offset O4 that was recently executed at the secondary VM 256. The information about the execution of ES $620_B$ at offset O5 at the secondary VM 256 is however missing. The fault-tolerance module at the primary VM 206 monitors the replies to other events, looking for an ack that contains information about O5's execution. When the fault-tolerance module at the primary VM 206 receives an ack En 634 that contains the time at which the event at offset O5 was executed at the secondary VM 256, the cycle is complete: [T6, O5] 642. To compute the execution latency between the primary VM 206 and the secondary VM 256, at time T4, the secondary VM 256 lags behind the primary VM 206 by (T6-T4). The execution latency is, therefore, T6-T4, where the time may be expressed in units such as milliseconds or microseconds.

Figure 7:
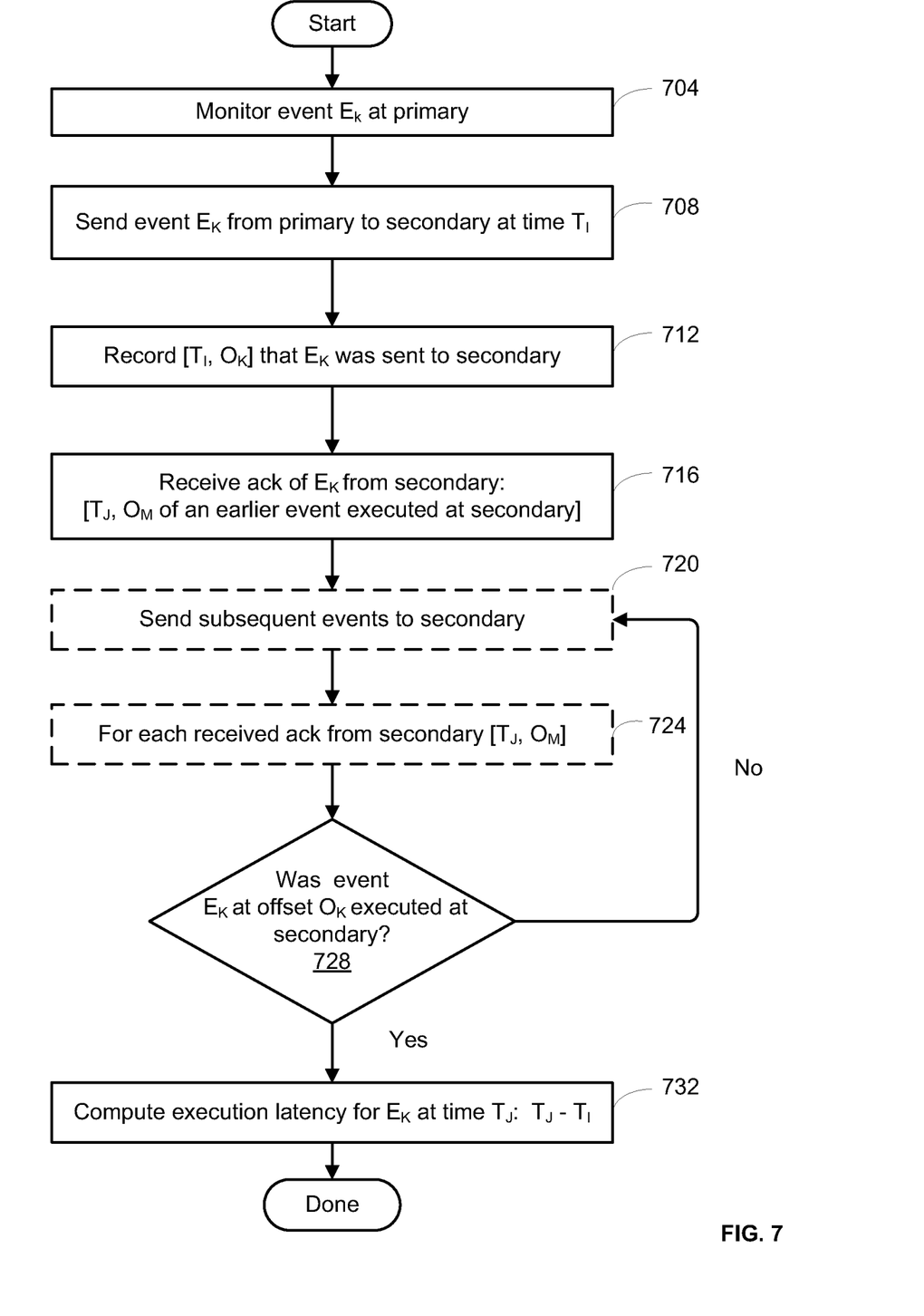
FIG. 7 presents a flowchart that illustrates a process for determining the execution latency of the pair of fault-tolerant VMs in accordance with one or more embodiments of the present invention.

FIG. 7 presents a flowchart that illustrates a process for determining the execution latency of a pair of fault-tolerant virtual machines in accordance with one or more embodiments of the present invention. It should be recognized that the specific arrangement of steps shown in the figure should not be construed as limiting the scope of the embodiments.

The process begins by monitoring a particular event $E_K$ (or offset) that will be sent from the primary VM to the secondary VM (step 704). It can also be said that the system is sampling a particular offset, say $O_K$ for event $E_K$.

Next, the fault-tolerance module of the primary VM sends event $E_K$ to the secondary VM at time $T_1$ (step 708).

Next, the system remembers the pair $[T_1, O_K]$, which describes the time at which event $E_K$ was sent to the secondary as well as the offset $O_K$ that uniquely identifies the event in the event buffer of both the primary VM and the secondary VM (step 712).

Next, the fault-tolerance module at the primary VM looks for a reply from the fault-tolerance module at the secondary VM to indicate receipt of event $E_K$ (step 716). The reply will contain the $[T_J, O_M]$ of some earlier event that has just been executed by the secondary VM at an earlier time. For example, $O_M$ uniquely identifies an event in the event buffer that is earlier than $O_K$. Since the system is not monitoring this offset, the system discards it.

Next, the fault-tolerance module of the primary VM continues to send newly generated events to the fault-tolerance module of the secondary VM (step 720).

Next, the fault-tolerance module of the primary VM receives each reply, or ack, from the fault-tolerance module of the secondary VM (step 724). Piggybacked on each reply is the pair $[T_J, O_M]$ that indicates that event at offset $O_M$ was executed by the secondary VM.

Next, for each ack and the piggybacked pair, the fault-tolerance module of the primary VM determines if the monitored event $E_K$ at offset $O_K$ was executed at the secondary VM (step 728). If an ack contains the piggybacked pair $[T_J, O_K]$, then the secondary VM indeed executed event $E_K$ at offset $O_k$.

Next, the fault-tolerance module of the primary VM computes the execution latency for event $E_K$: $T_J$-$T_I$ (step 732).

The process depicted in FIG. 7 can be executed any number of times to determine the execution latency for any monitored or sampled event. It is this execution latency value that is input into the phases that throttle the CPU resource limit or stabilize the CPU resource limit at a maximum value.

In another embodiment of FIG. 7, each event sent to the secondary VM could be sampled, a fine-grained approach that could yield a more accurate calculation of execution latency. More frequent sampling comes at the cost of more memory to hold a data structure. The primary VM would need to maintain a set of [Time, Offset] pairs, one pair for each event sent to the secondary VM for which the corresponding ack of that event's completion time has not yet been received. The amount of memory needed is likely to be proportional to the number of events sent for which the completion times are not yet known by the primary VM, and this has implications for the execution latency.

Figure 8:
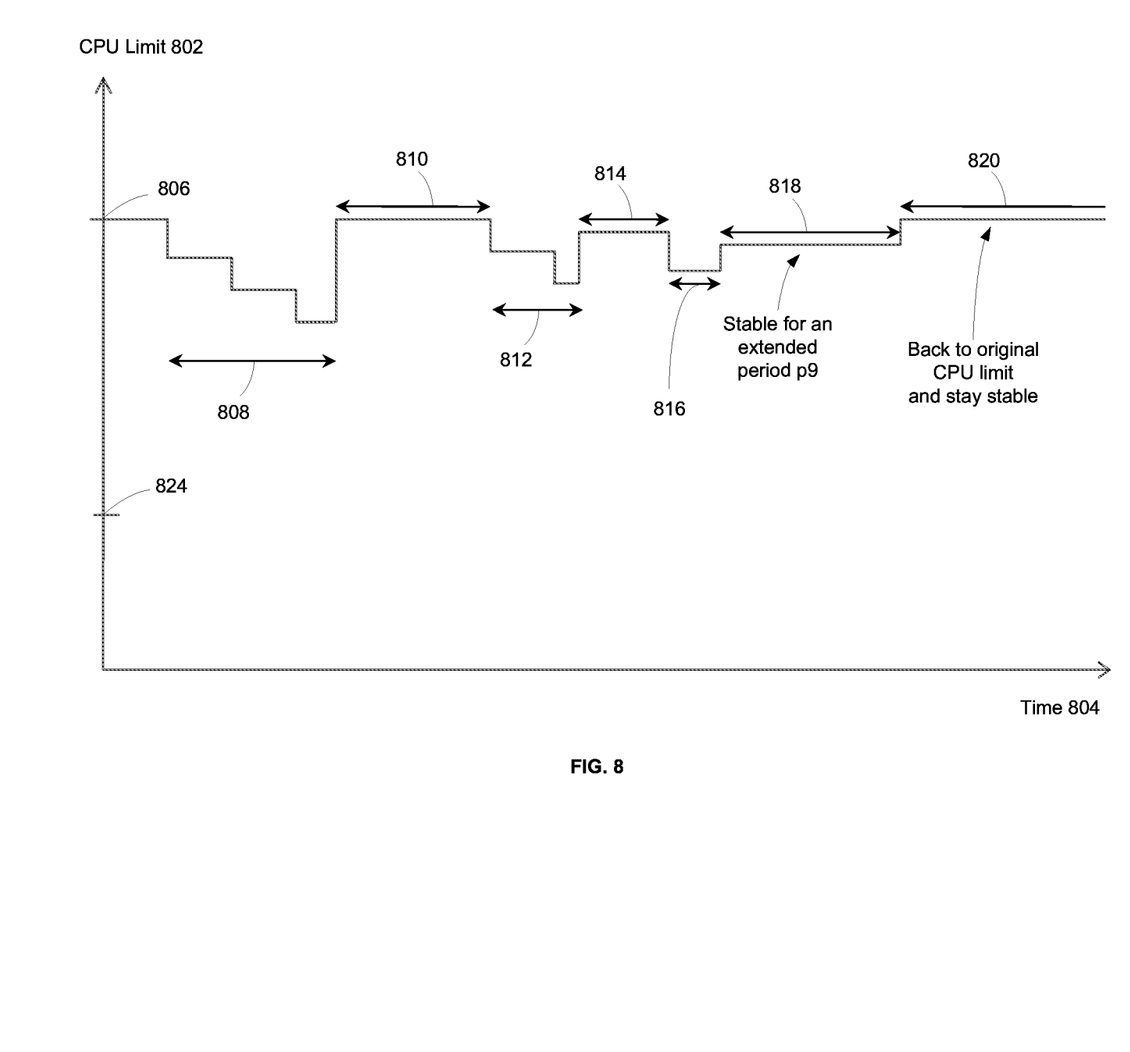
FIG. 8 presents a graph of CPU limit versus time and illustrates how the throttling method and stabilization method work together to achieve the goal of maximizing CPU resource consumption in accordance with one or more embodiments of the present invention.

FIG. 8 presents a graph of CPU limit versus time and shows how the throttling method and stabilization method work together to achieve the goal of maximizing CPU resource consumption at the primary VM while maintaining acceptable execution latency, in accordance with one or more embodiments of the present invention. In particular, the graph plots 'CPU Limit' 802 on the y-axis versus 'Time' 804 on the x-axis. The graph shows on the y-axis the original CPU limit 806 at the beginning of time. As time marches on (depicted moving toward the right), the CPU limit is adjusted downward in throttling phase 1 in an incremental fashion. This can be seen as a series of discrete steps, like stairs descending toward the right as time progresses: the throttling phase 1 808. The reason for the discrete steps instead of a smoothly sloping line down to the right is to not operate at any one level for too long and allow some waiting time for the secondary VM to catch up. If the secondary VM does not catch up sufficiently, the CPU limit will again be reduced just like stepping down another stair. This interval of time during which the system is operating with a specific CPU limit is called the waitInterval-CatchUp period to capture the goal of permitting the secondary VM to catch up in processing with the primary VM. Whenever the execution latency exceeds a pre-defined threshold as computed at the primary VM, the system computes a new CPU limit to deny the CPU more resources in order to allow the secondary VM the time to catch up. In one embodiment, the system uses Eq. 1 as one of the conditions to consider, in particular, (cpuLimit−execLatency/weight), where the 'p' of Eq. 1 is (1/weight). The system also takes into account how low the CPU limit can go to allow the primary VM to make some minimum progress, as well as the lowest limit specified by other virtual machines residing on the same physical host as the primary VM.

At some point in the future, the CPU limit on the primary VM has been adjusted downward a sufficient amount such that the execution latency has been reduced to an acceptable level. Since it is desirable to maximize the amount of CPU used by the primary VM, the system attempts to increase the CPU limit in the stabilization phase—while constantly monitoring the execution latency—in this case, the CPU limit is set to the original CPU limit 806 that was used at the beginning. This phase is shown in FIG. 8 as stabilize phase 1 (810), which continues for some time until the execution latency is again violated. This violation causes the system to enter the throttling phase again in an attempt to reduce the CPU limit, which can be seen in throttling phase 2 (812). As the execution latency continues to change and other factors like workload continue to change, the system throttles to reduce the CPU limit or stabilizes to maximize the CPU limit for as long an interval as possible. The remainder of FIG. 8 shows a stabilize phase 2 (814), followed by a rather short throttling phase 3 (816), and two relatively long periods of stability: a stabilize phase 3 (818) and a stabilize phase 4 (820), by which time the system has returned to the original CPU limit 806 and remains stable. Max(cpuLimitLowest, vmsSpecified-CPULimit) 824 represents the lowest possible meaningful bound on the CPU limit and is computed as the maximum of cpuLimitLowest and vmsSpecifiedCPULimit. The value in cpuLimitLowest represents the lower bound for how low the CPU resource limit can go. The value in vmsSpecified-CPULimit represents the specified CPU minimum resource lits for the other virtual machines residing on the same physical host as the primary VM.

Figure 9:
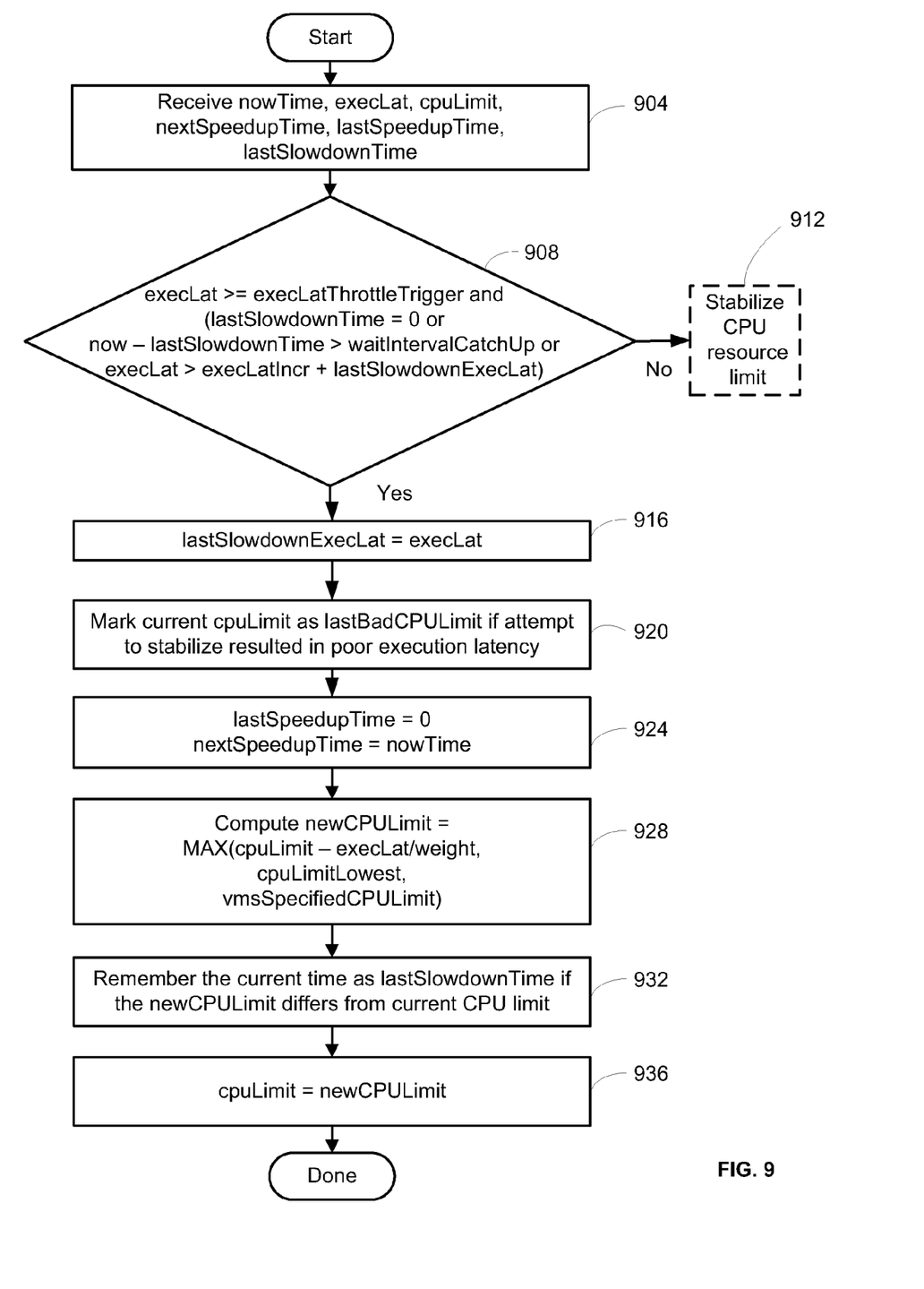
FIG. 9 presents a flowchart that illustrates a process for throttling the CPU resource limit in accordance with one or more embodiments of the present invention

FIG. 9 presents a flowchart that illustrates the throttling phase in accordance with one or more embodiments of the present invention. It should be recognized that the specific arrangement of steps shown in the figure should not be construed as limiting the scope of the embodiments. The throttling method expands on equation Eq. 1 by adjusting the method with additional modifications to achieve the performance goals. The method employs additional pre-defined threshold values, which can be derived based on execution latency requirement in real systems.

The process begins by receiving the current time (nowTime), the computed execution latency (execLat), the current CPU limit (cpuLimit), the last time stabilization was attempted (lastSpeedupTime), the last time throttling was attempted (lastSlowdownTime), and the next time stabilization would be attempted (nextSpeedupTime) (step 904).

Next, the system checks at most four conditions to determine whether throttling the CPU limit will begin (step 908). The first condition checks whether execLat is >=execLatThrottleTrigger, that is, whether the computed execution latency exceeds a pre-defined threshold. The result of this condition is AND'ed with the results of three sub-conditions that are OR'ed. The first sub-condition checks whether the system has tried slowing down the CPU at a previous time (lastSlowdownTime=0); if it is 0, then there had been no previous attempts. The second sub-condition checks whether the primary VM has stayed in the current CPU limit for a time interval that exceeds a predefined threshold (nowTime−lastSlowdownTime>waitIntervalCatchUp). This second sub-condition prevents the system from making overly frequent adjustments to the CPU limit on the primary VM and gives time for the secondary VM to catch up with the primary VM. The third sub-condition checks whether the execution latency since the last slowdown attempt has now increased by an increment, namely, execLatencyIncrement (execLat>lastSlowdown ExecL at execLatencyIncrement). Sub-condition 3 allows the primary VM to respond quickly when the execution latency increases quickly. Throttling is triggered whenever condition 1 and any of the three sub-conditions are true. Otherwise, stabilizing the CPU resource limit is attempted (step 912), which is described below in conjunction with FIG. 10.

Next, if the conditions of step 908 were satisfied, then the system remembers the current execution latency execLat in the variable lastSlowdownExecLat (step 916). The system maintains this history information to enable it to make better decisions down the road.

Next, the system records the current CPU limit (cpuLimit) as the lastBadCPULimit if the attempt to stabilize the CPU limit at a higher value resulted in a worse execution latency value (920). In this situation, the system stabilized the system at a previous time using this CPU limit and the interval since the lastSpeedupTime and the current time was too small to be judged a good latency interval. For this reason, the system remembers the last had CPU allocation value, and then it will adjust to a value slightly smaller than it during the next stabilization phase.

Next, the system re-initializes the last time the system attempted to stabilize the CPU limit at a higher value (lastSpeedupTime=0) and remembers the next time it will attempt to stabilize the CPU limit (nextSpeedupTime=nowTime) (step 924).

Next, the system determines a new CPU limit (step 928). The system considers reducing the current CPU limit by an amount equal to a weighted value of the execution latency (execLat)/weight and the base for adjustment is the last measured CPU consumption in a fixed-size sampling window. The system also considers the need to allow the primary VM to make some minimum progress and sets a lower bound for how low (at least cpuLimitLowest) the CPU resource limit can go. Finally, the system considers the specified CPU minimum resource limits for the other virtual machines residing on the same physical host as the primary VM (vmsSpecifiedCPULimit). Thus, the new computed CPU limit is the maximum over these three computed values. It should be recognized that even when the system is trying to throttle the system by reducing the CPU limit, it is still trying to find the highest CPU limit because, it is desirable to operate the primary VM at its maximum utilization.

Next, if this new CPU limit is different from the previous CPU limit (cpuLimit !=newCPULimit), then the system remembers the current time (nowTime) as the last time the system attempted to throttle (lastSlowdownTime=nowTime) (932).

Finally, the system sets the current CPU limit as the newly computed CPU limit (step 936). The system needs to remember the newly computed CPU limit because that value feeds into the calculations presented earlier during the throttling phase the next time the execution latency is computed and is found wanting.

Figure 10:
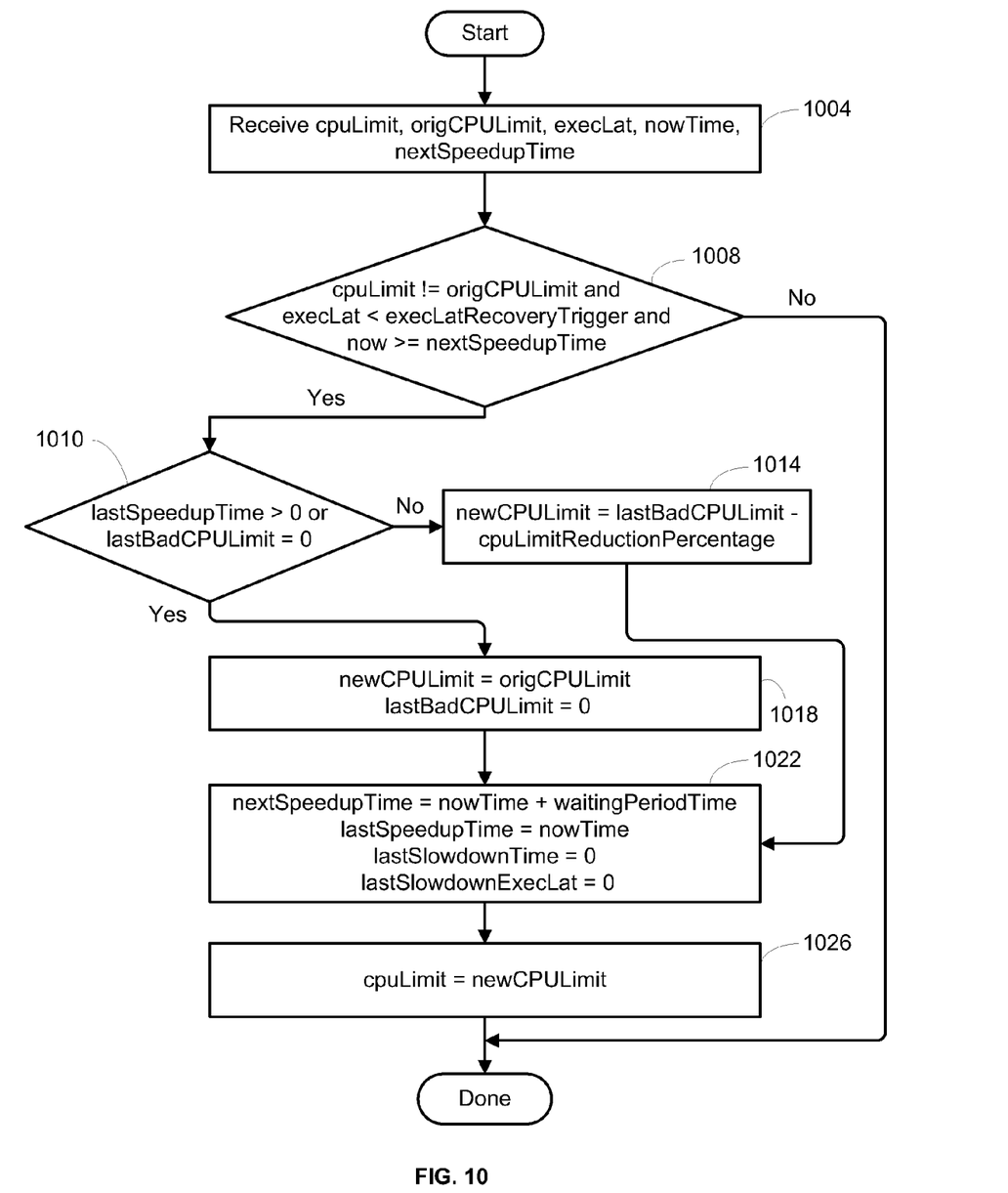
FIG. 10 presents a flowchart that illustrates a process for stabilizing the CPU resource limit around a maximum CPU resource limit in accordance with one or more embodiments of the present invention.

FIG. 10 presents a flowchart that illustrates a process for stabilizing the CPU resource limit around a maximum CPU resource limit in accordance with one or more embodiments of the present invention. It should be recognized that the specific arrangement of steps shown in the figure should not be construed as limiting the scope of the embodiments.

The stabilization phase seeks for a stable CPU allocation value from the original maximum allocation. The benefit of seeking from the top is to maximize the resource utilization for the primary VM, Given the practical causes for execution latency, this method is appropriate and will not incur too many unnecessary CPU adjustments. If the workload is such that the original maximum is often not the suitable one, then the throttling method would be more effective if it were modified to search for a stable value from its current CPU rather than from the original value. It is a trade-off between the primary VM's application performance and the recovery time for reaching a stable CPU allocation.

The process begins by receiving several recorded variables from a previous incarnation of the throttle/stabilize process, namely, cpuLimit (current CPU resource limit), origCPULimit (the original CPU limit), execLat (execution latency previously computed), nowTime (the current time), and nextSpeedupTime (the last time the system was in the stabilization phase) (step 1004).

Next, the system determines whether the primary VM needs to stabilize the CPU resource limit (step 1008). There are three conditions to consider. First, has the execution latency become small enough (execLat<execLatStabilizeTrigger)? Second, is the current CPU limit different from the original CPU limit (cpuLimit!=origLimit)? Third, has the system moved beyond the last stabilization phase (nowTime>=nextSpeedupTime)? If all three conditions are true, then the system proceeds to step 1010 and considers how to stabilize the CPU limit at a higher value than it is currently. Otherwise, the process ends.

Next, the system checks if it had previously attempted to stabilize the CPU resource limit (lastSpeedupTime>0) or that it had not tried a CPU limit that was previously considered 'bad' because it resulted in a higher execution latency (step 1010). If yes, then the system forgets the previously computed CPU limit and tries the original maximum CPU limit (step 1018). This makes sense since the goal for the stabilization is to execute at the default maximum CPU allocation as much as possible. But, as we noted earlier, it is possible that the default value is not a good value for keeping the primary VM and the secondary VM synchronized with each other. If no, then the system tries to adjust down the last bad CPU limit by a fixed percentage (newLimit=lastBadCPULimit−cpuLimitReductionPercentage) for each execution latency violation and transition to step 1022.

Next, the system computes the next speed up time as the current time plus a waiting period between two consecutive adjustments upwards in the CPU limit (step 1022) (nextSpeedupTime=nowTime+waitingPeriodTime). This ensures that system will operate in the newly found good state for a long enough duration before testing the original maximum value again. Further, the system updates the last speed up time with the current time (lastSpeedupTime=nowTime) and reinitializes the last time the system throttled the CPU limit (lastSlowdownTime=0) and the execution latency at the last time the system throttled the CPU limit (lastSlowdownExecLat=0) for the next round.

Finally, the system remembers the newly computed CPU limit (step 1026) (cpuLimit=newCPULimit). This new limit is ultimately sent to the CPU scheduler in the hypervisor of the primary computer system.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for synchronizing execution of a first virtual machine and a second virtual machine which are organized as a fault-tolerant pair of virtual machines, wherein the first virtual machine is a primary virtual machine and executes within a first computer system and the second virtual machine is enabled to track the state of the primary virtual machine and executes within a second computer system, the method comprising:

determining an execution latency between the first virtual machine and the second virtual machine, wherein the execution latency represents the difference in time between a first time at which an event is executed at the first virtual machine and a second time at which the same event is executed at the second virtual machine; and adjusting a CPU resource limit in the first virtual machine in proportion to the determined execution latency, wherein the CPU resource limit is an allocation of CPU processing capability of the first computer system.

2. The method of claim 1, wherein determining the execution latency comprises:
sampling an event at the first virtual machine and recording a first time at which the event was executed at the first virtual machine;
receiving the same event at the second virtual machine;
executing the same event at the second virtual machine and recording a second time at which the same event was executed at the second virtual machine; and
computing the execution latency by subtracting the first time from the second time.

3. The method of claim 1, wherein adjusting the CPU resource limit comprises:
throttling the CPU resource limit based on the determined execution latency and other pre-determined threshold parameters; and
stabilizing the CPU resource limit at a maximum CPU resource limit value.

4. The method of claim 3, wherein throttling the CPU resource limit comprises:
receiving the determined execution latency; and
if the determined execution latency exceeds a pre-defined threshold, reducing the CPU resource limit of the first virtual machine in proportion to the determined execution latency.

5. The method of claim 3, wherein stabilizing the CPU resource limit comprises:
setting the CPU resource limit to either the original maximum CPU resource limit or a fixed percentage of a newly computed CPU resource limit if the determined execution latency exceeds a pre-defined threshold.

6. The method of claim 1, wherein the primary virtual machine is active and interacts with the external world and the secondary virtual machine is passive and invisible to the external world as the secondary virtual machine tracks the state of the primary virtual machine.

7. The method of claim 1, wherein the CPU resource limit is expressed as a percentage of the CPU or the CPU speed.

8. A non-transitory computer-readable storage medium for storing instructions that, when executed by a computer system causes the computer system to perform a method for synchronizing execution of the first virtual machine and a second virtual machine which are organized as a fault-tolerant pair of virtual machines, wherein the first virtual machine is a primary virtual machine and executes within a first computer system and the second virtual machine is enabled to track the state of the primary virtual machine and executes within a second computer system, the method comprising:
determining an execution latency between the first virtual machine and the second virtual machine, wherein the execution latency represents the difference in time between a first time at which an event is executed at the first virtual machine and a second time at which the same event is executed at the second virtual machine; and
adjusting a CPU resource limit in the first virtual machine in proportion to the determined execution latency.

9. The non-transitory computer-readable storage medium of claim 8, wherein determining the execution latency comprises sampling an event at the first virtual machine and recording a first time at which the event was executed at the first virtual machine;
receiving the same event at the second virtual machine;
executing the same event at the second virtual machine and recording a second time at which the same event was executed at the second virtual machine; and
computing the execution latency by subtracting the first time from the second time.

10. The non-transitory computer-readable storage medium of claim 8, wherein adjusting the CPU resource limit comprises:
throttling the CPU resource limit based on the determined execution latency and other pre-determined threshold parameters; and
stabilizing the CPU resource limit at a maximum CPU resource limit value.

11. The non-transitory computer-readable storage medium of claim 10, wherein throttling the CPU resource limit comprises:
receiving the determined execution latency; and
if the determined execution latency exceeds a pre-defined threshold, reducing the CPU resource limit of the first virtual machine in proportion to the determined execution latency.

12. The non-transitory computer-readable storage medium of claim 10, wherein stabilizing the CPU resource limit comprises setting the CPU resource limit to either the original maximum CPU resource limit or a fixed percentage of a newly computed CPU resource limit if the determined execution latency exceeds a pre-defined threshold.

13. The non-transitory computer-readable storage medium of claim 8, wherein the CPU resource limit is expressed as a percentage of the CPU or the CPU speed.

14. A computer system that synchronizes execution of a first virtual machine and a second virtual machine which are organized as a fault-tolerant pair of virtual machines, wherein the first virtual machine is a primary virtual machine and executes within a first computer system and the second virtual machine is enabled to track the state of the primary virtual machine and executes within a second computer system, the computer system comprising:
a processing unit; and
a memory,
wherein the processing unit is configured to determine an execution latency between the first virtual machine and the second virtual machine, wherein the execution latency represents the difference in time between a first time at which an event is executed at the first virtual machine and a second time at which the same event is executed at the second virtual machine,
and adjust a CPU resource limit in the first virtual machine in proportion to the determined execution latency.

15. The computer system of claim 14, wherein the processing unit is further configured to determine the execution latency by:
sampling an event at the first virtual machine and recording a first time at which the event was executed at the first virtual machine;
receiving the same event at the second virtual machine;
executing the same event at the second virtual machine and recording a second time at which the same event was executed at the second virtual machine; and
computing the execution latency by subtracting the first time from the second time.

16. The computer system of claim 14, wherein the processing unit is further configured to adjust the CPU resource limit by:
throttling the CPU resource limit based on the determined execution latency and other pre-determined threshold parameters; and
stabilizing the CPU resource limit at a maximum CPU resource limit value.

17. The computer system of claim 16, wherein throttling the CPU resource limit comprises:
   receiving the determined execution latency; and
   if the determined execution latency exceeds a pre-defined threshold, reducing the CPU resource limit of the first virtual machine in proportion to the determined execution latency.

18. The computer system of claim 16, wherein stabilizing the CPU resource limit comprises setting the CPU resource limit to either the original maximum CPU resource limit or a fixed percentage of a newly computed CPU resource limit if the determined execution latency exceeds a pre-defined threshold.

19. The computer system of claim 14, wherein the primary virtual machine is active and interacts with the external world and the secondary virtual machine is passive and invisible to the external world as the secondary virtual machine tracks the state of the primary virtual machine.

20. The computer system of claim 14, wherein the CPU resource limit is expressed as a percentage of the CPU or the CPU speed.

* * * * *